United States Patent
Tito

[15] 3,677,283
[45] July 18, 1972

[54] BALL VALVE

[72] Inventor: Kostag V. Tito, 14 Forest Street, Saco, Maine

[22] Filed: April 16, 1970

[21] Appl. No.: 29,179

[52] U.S. Cl. ............................................. 137/338, 251/366
[51] Int. Cl. .................................................. F16k 49/00
[58] Field of Search ................... 137/338; 251/315, 366, 367

[56] References Cited

UNITED STATES PATENTS

| | | | |
|---|---|---|---|
| 3,411,746 | 11/1968 | Scaramucci | 137/338 X |
| 3,058,484 | 10/1962 | Feiring | 251/315 X |
| 2,496,452 | 2/1950 | Eichenberg et al. | 137/338 X |
| 3,097,662 | 7/1963 | Peters | 137/338 |
| 3,294,148 | 12/1966 | Alvarado | 137/338 |
| 3,446,476 | 5/1969 | Scaramucci | 251/315 X |
| 3,384,341 | 5/1968 | Ripert | 251/315 |
| 3,386,699 | 6/1968 | Petter et al. | 251/315 |
| 3,463,451 | 8/1969 | Treadwell | 251/315 |

*Primary Examiner*—Samuel Scott
*Attorney*—Abbott Spear

[57] ABSTRACT

Ball valves are disclosed that are particularly adapted for constructions where their ports are to have conduit ends connected thereto by soldering, brazing, or welding. For such uses, the sealing means of the valves are protected by a heat-dissipating fin arrangement. The valve bodies preferably consist of sleeve-like members with port members threaded into the ends thereof. The bore through each sleeve-like member is eccentric enabling it to have minimum cross-sectional dimensions with its thickest part providing adequate stock for the support of the operating means which preferably consist of a key on a stem insertable through a slot in the bottom of the bonnet into a keyway in the ball valve element and seating the stem when the key is caught under the bottom of the bonnet.

4 Claims, 3 Drawing Figures

PATENTED JUL 18 1972
3,677,283
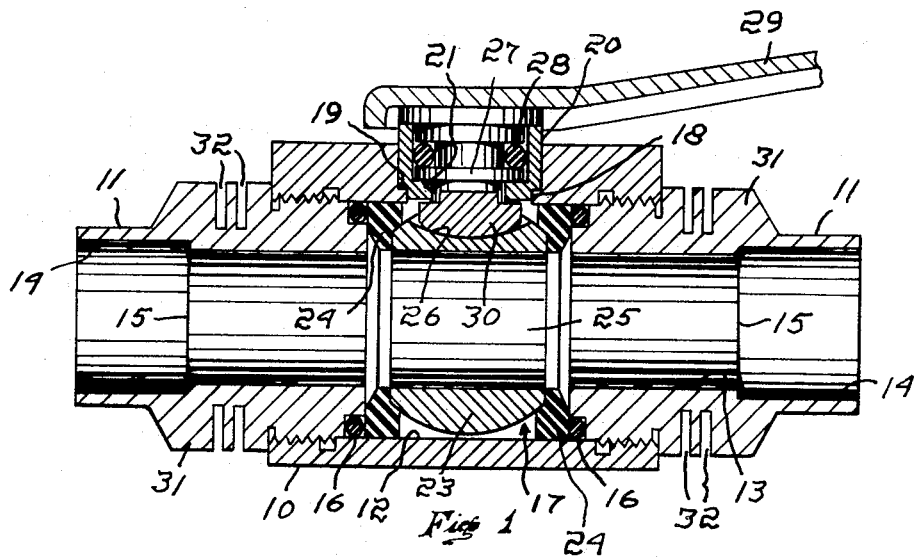
Fig. 1
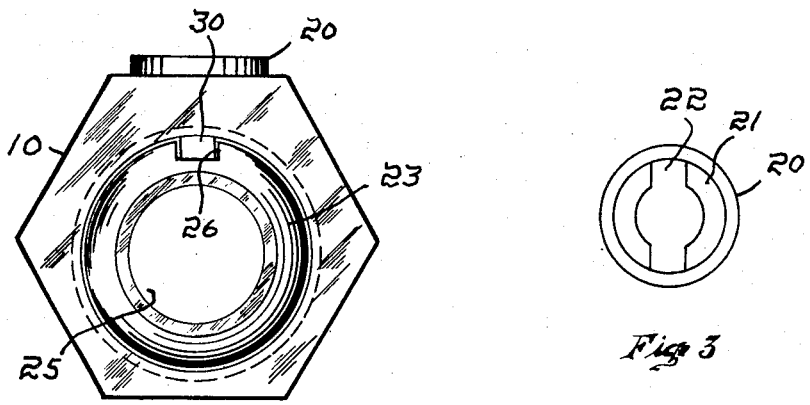
Fig. 2
Fig. 3
INVENTOR
Kostas V. Tate
BY Albert Lyons
Attorney

BALL VALVE

The present invention relates to ball valves particularly adapted for use when conduit ends are to be connected to its ports by soldering, brazing, or welding but having features for use in ball valves that may be otherwise installed.

While ball valves are widely used, problems exist in their construction, installation, and servicing. This is particularly true where a valve is to be installed in a conduit with the connections being effected by soldering, brazing, or welding. In such installations, there is a very real danger that the heat required for such an operation will so damage the seals that leakage will occur.

It is also desired that valves be as small as possible, as far as cross sectional dimensions are concerned, in relation to the size of the conduit to be connected thereto.

In addition, there is a problem of service, particularly in connection with steam seals, in ensuring maximum ease and convenience in effecting their replacement.

SUMMARY OF THE INVENTION

One objective of the present invention is to provide a ball valve in which the sealing means are protected against being damaged by heat attendant the connection of conduits thereto by soldering, brazing, or welding, an objective attained with a ball valve having ports, each adapted to receive a conduit end and have it secured therein by soldering, brazing, or welding. Between each such port and the sealing means, heat dissipating fins are provided.

Another objective of the invention is to provide ball valves of the type having a body consisting of a sleeve member with port members secured in the ends thereof with the ball valve member and its annular seals between them. Each port member is provided with a shoulder engaging the end of the sleeve member to which it is secured thus to ensure, in the assembled valve, the correct spacing between the inner ends of the port members to provide a chamber appropriate for the ball valve member and its seals. The shoulders are of substantial axial extent and have peripheral, transverse, fin-defining slots located between the portions of the port members to which heat is applied and the proximate seals.

Another objective of the invention is to ensure that valve bodies whether metal or plastic are of minimum cross sectional dimensions. This result is attained by providing that the bore through the sleeve member is eccentric to provide that its thickest part has adequate strength for the proper support of the valve operating means.

Yet another objective of the invention is to provide valve operating means that may be quickly and easily attached or detached from the ball valve element. This objective is attained with valve operating means comprising a bonnet sealed in a bore through the side of the valve body which opens into the ball chamber and having a transverse slot in its bottom wall. The ball valve elements are provided with a grove or keyway to receive a key carried by the stem of the operating means. In accordance with the invention, the stem carries an annular seal and its key may pass through the slot of the bonnet and enter the keyway when in registry therewith. When the stem is turned, the key is caught under the closed end of the bonnet with the stem securely bottomed against the bottom ball of the bonnet.

In the accompanying drawings, there is shown an embodiment of the invention illustrative of these and other of its objectives, novel features and advantages.

In the drawings:

FIG. 1 is a section taken lengthwise of a valve;

FIG. 2 is an end view of the sleeve-like body member; and

FIG. 3 is a top plan view of the body.

The ball valve shown in the drawings has a body consisting of a sleeve member 10 and end or port members 11. The sleeve member 10 has a bore 12 extending from end-to-end thereof with end portions threaded to receive the threaded ends of the port members 11. Each member 11 has a bore 13 extending therethrough with its outer end counterbored as at 14 to slidably receive an end of a conduit in which the valve is to be installed and provide a shoulder 15 against which that end may be seated. The inner end of each port member 11 has a peripheral shoulder for an annular seal 16 and constitutes an end boundary of a central chamber generally indicated at 17.

The counterboard sleeve 10 has a bore 18 opening through its side into the chamber 18 and counterbored to provide a seat 19 for a bonnet 20 which is secured therein as by soldering, brazing, or welding. The bonnet 20 has its closed end 21 provided with a transverse slot 22. A ball valve element 23 confined between the inner edge portions of annular seals 24, each backed by the appropriate one of the chamber boundary-defining ends of a port member 11. The ball element 23 has a diametrically disposed passage 25 and a convex groove 26 exposed under the closed end of the bonnet 20.

In order that the ball valve element 23 may be turned from a position in which it passage 25 effects communication between the bores of the port members 11, a stem 27 is provided that is dimensioned to fit the bonnet 20 and is provided with an annular recess for a seal 28. A handle 29 is secured to the outer end of the stem 27 and its inner end is provided with a convex key 30 dimensioned for entry through the slot 22 into the groove 26 of the ball valve element 23 when the groove 26 is in registry with the bonnet slot 22. When the handle 29 is then turned, the key 30 becomes caught under the closed end of the bonnet 21 and the stem 27 is securely bottomed in the bonnet. The slot 22 is disposed so that the handle must be turned slightly beyond its closed position if the key 30 is to be withdrawn through the slot 22 to permit, for example, the seal 28 to be removed and replaced.

In order that the cross sectional dimensions of the sleeve member 10 may be kept at a minimum, the bore 12 is eccentric and the bore 19 extends through the thickest part thereof to provide adequate strength and sufficient stock to hold the bonnet 20.

Each port member 11 is shown as having an annular shoulder 31 which butts against the end of the sleeve member 11 into which it is threaded thus to precisely position its inner end in relation to that of the other port member 11 so that their proximate ends become end boundaries of the chamber 17. Each shoulder 31 is of substantial axial extent and when the valve is to be connected to the conduit ends by soldering or brazing operations, it is formed with parallel, peripheral slots 32 of substantial depth thus to provide heat dissipating fins and these are located between the shoulders 15 and the several seals of the valve thus to protect them against damage by the heat required for brazing, soldering, and welding when the conduit ends are secured.

The bore 12 is shown as dimensioned to enable the seals 24 and the ball valve element 23 to be inserted through either end. By first seating one seal 24 against the inner end of an installed port member 11, the valve assembly may be completed by then introducing the element 23 with its slot 26 in registry with the bonnet slot 22 thus to enable the stem 21 to be connected thereto. The other seal 24 is then inserted after which the other port member 11 may be threaded in place.

I claim:

1. A ball valve comprising a sleeve-like body having a central eccentric chamber and coaxial end bores opening therein of a diameter such that shoulders are provided that establish end boundaries of the chamber, a bore opening into the chamber through the thickest side part of the body, a ball valve element in said chamber and having a passage extending therethrough, an annular seal backed by each shoulder and engaging said element, a bonnet secured in the last name bore, and means connected to the element through the bonnet and rotatably sealed therein and operable to turn said element between a first position in which its passage effects communication between the end bores and a second position in which said passage is blocked therefrom by said seals.

2. The ball valve of claim 1 in which the body includes a first member in the form of a sleeve having a bore extending from end-to-end thereof, the end portions of the bore being threaded, and port members threaded in said end portions with their inner ends constituting the shoulders that are the end boundaries of the chamber and back the seals, each port member including the heat dissipating fins and a counterbore at its outer end.

3. The ball valve of claim 1 in which a bonnet is secured in the bore opening into the chamber from the side of the sleeve, the bonnet includes a closed inner end having a transverse slot, the ball valve element has a groove underlying the bonnet in either position, and the means operable to turn the ball element include a stem fitting within the bonnet and provided with an annular seal and a key dimensioned to pass through the bonnet slot and into the groove of the ball element when in alignment therewith, the bonnet slot being disposed so that such alignment occurs in a second position of the ball element, the end surface of the bonnet exposed within the chamber being engageable with the proximate edge surfaces of the key in any other position of the ball element then to prevent the disengagement of the key therefrom.

4. A ball valve comprising a body having a central chamber and end ports in communication therewith, annular seals at the ends of the chamber, a bore opening into the chamber through the side of the body, a ball valve element in said chamber between said seals and having a passage extending therethrough, a bonnet secured in the bore entering the side of the chamber and including a closed inner end having a transverse slot, a rotatable stem fitting said bonnet and provided with an annular seal dimensioned for sliding sealing engagement with the interior of the bonnet and a key dimensioned to pass through said slot, said element having a groove underlying the slot and in alignment therewith in a position of the element in which its passage is closed from the ports by the annular seals, the groove then receiving the key, the end surfaces of the bonnet exposed within the chamber being engageable by the proximate edge surfaces of the key in any other position of the base element then to prevent disengagement of the key therefrom and constituting the only means to prevent the withdrawal of the stem.

* * * * *